United States Patent [19]

Isgur et al.

[11] 4,110,508

[45] Aug. 29, 1978

[54] FOAM SHEET AND METHOD

[75] Inventors: Irving E. Isgur, Framingham; Andrew B. Holmstrem, Burlington; Norman J. Hayes, Bedford, all of Mass.

[73] Assignee: W. R. Grace & Co., Cambridge, Mass.

[21] Appl. No.: 656,674

[22] Filed: Feb. 9, 1976

[51] Int. Cl.$^2$ .......................... B32B 5/02; B32B 5/16; B32B 5/30

[52] U.S. Cl. .................................. 428/240; 428/283; 428/290; 428/425; 428/314; 428/310; 428/315; 428/327; 427/180

[58] Field of Search .................. 428/402, 423, 425, 95, 428/240, 306, 323, 904, 311, 315, 327, 283, 290, 314, 310; 260/2.5 AK; 162/164 R, 168 N; 427/180

[56] References Cited

U.S. PATENT DOCUMENTS

| 3,594,335 | 7/1971 | Schultz et al. ................. 260/2.5 AK |
| 3,694,301 | 9/1972 | Gruenewald et al. ............... 428/292 |
| 3,745,041 | 7/1973 | Raymond ............................. 428/904 |
| 3,861,993 | 1/1975 | Gutherie .............................. 428/425 |
| 3,874,964 | 1/1975 | Cogliano et al. ....................... 428/95 |

FOREIGN PATENT DOCUMENTS 1,284,090  11/1968  Fed. Rep. of Germany ........... 428/425

*Primary Examiner*—Ralph S. Kendall
*Attorney, Agent, or Firm*—Lowell H. McCarter; C. Edward Parker

[57] ABSTRACT

The invention disclosed is for a foam sheet fabric prepared using a hydrophilic crosslinked polyurethane component prepared by reacting an isocyanate capped polyoxyethylene polyol reactant with large amounts of an aqueous reactant. The resultant fabrics may be characterized with a broad spectrum of improved properties including improved comfort, moisture control, ease of processing and may contain selective additives such as fibers, fire retardants or the like.

21 Claims, No Drawings

FOAM SHEET AND METHOD

This invention relates to new improved foam sheet fabrics formed of a hydrophilic crosslinked polyurethane, and to a method for preparing same. More particularly, the present invention relates to fabrics or composites prepared by layering shredded foam particles of a previously formed hydrophilic polyurethane component prepared from a capped polyoxyethylene polyol reactant having a defined average reaction functionality greater than two which is admixed with large amounts of an aqueous reactant.

Numerous attempts have been made in the prior art to produce polyurethane foam composites or fabrics. Typically, these techniques require very expensive and complex machinery or else the attempts have resulted in sheets without uniform thickness or otherwise lack necessary skin and border characteristics. For numerous reasons, prior art polyurethanes, although used for fabrics, have retained serious disadvantages including expensive and highly sensitive processing requirements with relatively hydrophobic foam compositions, and thus poor comfort and moisture control resulting in the finally prepared product.

It has now been surprisingly found, however, that improved fabrics using a hydrophilic crosslinked polyurethane may be prepared simply by forming a foam component using a particular isocyanate capped polyoxyethylene polyol reacted with large but controlled amounts of an aqueous reactant. Next, the prepared generated polyurethane foam, typically characterized by having a crosslinked, i.e., non-linear, molecular network is shredded into small foam particles and layered to form a fabric sheet. If desired, further materials such as fibers, fillers, binders or the like may be included with the shredded foam at the time of layering. The fabric which results has a broad spectrum of improved properties, including comfort, moisture control, temperature and solvent resistance, coupled with ease of processing and when containing selective additives, improved strength, fire retardancy, or like characteristics.

Generally, crosslinked hydrophilic polyurethanes may be prepared by capping polyoxyethylene polyol with a polyisocyanate such that the capped product has a reaction functionality greater than two. Optionally, the capped product and/or aqueous reactant may contain a suitable crosslinking agent if desired, in which case the capped polyoxyethylene polyol product may have a functionality approximating 2.

During capping, it is desirable that polyisocyanate be reacted with the polyol such that the reaction product, i.e., the capped product, is substantially void of reactive hydroxy groups while containing more than two reactive isocyanate sites per average molecule. Another route for achieving this desired result is to react a polyisocyanate having two reactive active isocyanate sites per average molecule, in a reaction system having a polyfunctional reactive component such as one having from three up to about six or more reactive amine, hydroxy, thiol, or carboxylate sites per average molecule. These latter sites are highly reactive with the two reactive isocyanate sites and thereby form a dimensional product.

Polyoxyethylene polyol used as a reactant in preparing the capped product to be foamed may have a weight average molecular weight of about 200 to about 20,000, and preferably between about 600 to about 6,000, with a hydroxyl functionality of about 2 or greater, preferably from about 2 to about 8.

Polyoxyethylene polyol is terminated or capped by reaction with a polyisocyanate. The reaction may be carried out using known techniques. The polyisocyanates used for capping the polyoxyethylene polyol include polyisocyanates and polyisothiocyanates which are PAPI-1 (a polyaryl polyisocyanate as defined in U.S. Pat. No. 2,683,730), tolylene diisocyanate, triphenylmethane-4,4',4''-triisocyanate, benzene-1,3,5-triisocyanate, toluene-2,4,6-triisocyanate, diphenyl-2,4,4'-triisocyanate, hexamethylene diisocyanate, xylene diisocyanate, chlorophenylene diisocyanate, diphenylmethane-4,4'-diisocyanate, naphthalene-1, 5-diisocyanate, xylene-alpha,alpha'-diisothiocyanate, 3,3'-dimethyl-4,4'-biphenylene diisocyanate, 3,3'-dimethoxy-4,4'-biphenylene diisocyanate, 2,2'5,5'-tetramethyl-4,4'-biphenylene diisocyanate, 4,4'-methylenebis (phenylisocyanate), 4,4'-sulfonylbis (phenylisocyanate), 4,4'-methylene di-ortho-tolylisocyanate, ethylene diisocyanate, ethylene diisothiocyanate, trimethylene diisocyanate and the like. Mixtures of any one or more of the above mentioned organic isothiocyanates or isocyanates may be used as desired. The aromatic diisocyanates and polyisocyanates or mixtures thereof which are especially suitable are those which are readily commercially available, have a high degree of reactivity and a relatively low cost.

Capping of the polyoxyethylene polyol may be effected using stoichiometric amounts of reactants. Desirably, however, an excess of isocyanate is used to insure complete capping of the polyol. Thus, the ratio of isocyanate groups to the hydroxyl groups used for capping is between about 1 to about 4 isocyanate to hydroxyl, and preferably about 1.5 to about 2.5 isocyanate to hydroxyl molar ratio.

To obtain the maximum strength, solvent resistance, heat resistance, and the like, the isocyanate capped polyoxyethylene polyol reaction products are formulated in such a manner as to give crosslinked, three dimensional network polymers. In order to achieve such infinite network formation, the reactive components may be formulated in one of the following by way of example. First, when water is the sole reactant with the isocyanate groups leading to chain growth, the isocyanate capped polyoxyethylene polyol reaction product must have an average isocyanate functionality greater than 2 and up to about 8 or more depending upon the composition of the polyol and capping agent components. Secondly, when the isocyanate capped polyoxyethylene polyol has an isocyanate functionality of only about two, then the water or aqueous reactant used may contain a dissolved or dispersed isocyanate-reactive crosslinking agent having an effective functionality greater than two. In this case, the reactive crosslinking agent is reacted with the capped polyoxyethylene polyol when admixed during and after the reaction process has been initiated. Thirdly, when the isocyanate capped polyoxyethylene polyol has an isocyanate functionality of only about two, then a polyisocyanate crosslinking agent having an isocyanate functionality greater than two may be incorporated therein, either preformed or formed in situ, and the resultant mixture may then be reacted with water or aqueous reactant, optionally containing a dissolved or dispersed reactive isocyanate-reactive crosslinking agent, leading to a crosslinked, infinite network hydrophilic polyurethane.

Several different modes may be used to prepare the hydrophilic capped polyoxyethylene polyol reaction product having an average isocyanate functionality greater than two. One useful mode is to polymerize ethylene oxide in the presence of a polyfunctional hydroxyl containing a starter component such as glycerol, trimethylolpropane, triethanolamine or trimethylolethane and the like which leads to polyoxyethylene triols. The molecular weight of these polymeric triols so prepared may be varied greatly depending on the number of moles of ethylene oxide used in the reaction with the starter component. Starter components such as pentaerythritol or ethylene diamine, sorbitol and sucrose likewise treated with ethylene oxide lead to polymeric polyoxyethylene tetrols, hexols, and octols, respectively. Alternatively, polyols suitable for capping with polyisocyanate may be prepared from diols, triols, tetrols, hexols and the like; and polycarboxylic acids.

Most any polyoxyethylene diols, triols, tetrols, hexols or octols may be capped with isocyanate end groups by reaction with an appropriate amount of polyisocyanate. Further, blends or mixtures of the various polyols and/or polyisocyanates may be used as desired so long as the total average isocyanate functionality of the final urethane containing reaction product is greater than two.

Another possible mode used to prepare the capped polyoxyethylene polyol reaction product having an average isocyanate functionality greater than two is by reacting polyoxyethylene glycol having a reactive functionality equal to 2, with a molar excess of a diisocyanate which leads to an isocyanate capped polyurethane product (A) having an isocyanate functionality of two. A polyol such as pentaerythritol having a reactive functionality equal to 4 is reacted with a large molar excess of a diisocyanate to form an isocyanate capped polyurethane intermediate product (B) having an isocyanate functionality of four. By blending the two isocyanate capped products thus prepared, i.e., products (A) and (B), in various molar proportions, the resulting product mixture has an average isocyanate functionality greater than two and on treatment with aqueous reactants will lead to hydrophilic crosslinked polyurethanes useful in practice of the present invention. In addition, other monomeric or polymeric polyisocyanate crosslinking agents may be substituted for the tetraisocyanate product (B). Tolylene 2,4,6-triisocyanate having reactive functionality of 3 is an example of a simple monomeric triisocyanate which may be usefully employed to achieve the same objective of imparting to the system an average isocyanate functionality greater than two.

Still another useful mode for preparing crosslinked hydrophilic polyurethanes is by using an isocyanate capped polyoxyethylene polyol reaction product having an average functionality of about two or greater which may be prepared as described previously. The technique following is crucial for those formulations where the average isocyanate functionality is only about two, because in these instances reaction with a large amount of water yields only a substantially linear, soluble thermoplastic product having very little, if any, practical or commercial utility. Thus, when it is desired to carry out the reaction using this latter technique, the water or aqueous reactant used is pre-treated to contain a polyfunctional crosslinking agent which is reactive with isocyanate end groups of the capped reaction product. Such crosslinking agents may be solubilized or dispersed in the water or aqueous reactant, and must be sufficiently compatible with the capped reaction product to be able to react with the isocyanate groups and thus cause a crosslinked, insoluble, thermosetting network to form. In this technique, then, a crosslinking agent reactive with isocyanate groups is contained in the water or aqueous reactant. After mixing with the isocyanate capped polyoxyethylene polyol reaction products, a crosslinking reaction results. The presence of the crosslinking agent in the water or aqueous reactant is crucial when the isocyanate capped reaction product has a functionality of only about two and only optional when the functionality thereof is greater than two.

Operable water soluble or water dispersible crosslinking agents desirably should be polyfunctional and reactive with isocyanate groups and include but are not limited to materials such as diethylenetriamine, triethylene-tetramine, tetraethylenepentamine, polyethyleneimine, glycerol, trimethylolpropane, pentaerythritol, tolylene-2,4,6-triamine, ethylene diamine, trimethylenediamine, tetramethylenediamine, pentamethylenediamine, hexamethylenediamine, ethanolamine, diethanolamine, hydrazine, triethanolamine, benzene-1,2,4-tricarboxylic acid, nitrilotriacetic acid, citric acid, 4,4'-methylenebis(o-chloroaniline), and the like. The water soluble or water dispersible crosslinking agents chosen are those which cause a crosslinked network to form.

It has also been found that the capped polyoxyethylene polyol having an isocyanate functionality greater than two used to prepare a three dimensional network polymer must be present in an amount sufficient to insure formation of the three dimensional network. Thus, amounts of the capped polyoxyethylene polyol having an isocyanate functionality greater than two range from about 3% by weight of the resin component up to 100% by weight. It is possible to include a capped polyoxyethylene polyol having a terminal member with an isocyanate functionality of two, i.e., a diisocyanate in an amount from 0% by weight up to about 97% by weight of the resin component. The maximum amounts of diisocyanate used are limited to that necessary to permit crosslinking to take place, as contrasted to formation of a linear polymeric structure, and the properties desired in the finally prepared fiber composite product.

The polyoxyethylene polyols used herein are water soluble reaction products derived from the polymerization of ethylene oxide in the presence of a polyfunctional starter compound such as water, ethylene glycol, glycerol, pentaerythritol, sucrose and the like. The molecular weights may be varied over a wide range by adjusting the relative ratios of ethylene oxide monomer to starter compound. The preferred molecular weight ranges have been described previously.

It is possible and sometimes desirable to incorporate small amounts of a relatively hydrophobic comonomer into the ethylene oxide based polymerization products. Thus, comonomers such as propylene oxide or butylene oxide may be copolymerized as a random copolymer, block-copolymer, or both, such that the copolymers remain hydrophilic while having other desirable features for certain applications, namely, improved low temperature flexibility, resistance to compression set, resiliency and the like. Up to about 40 mole percent but desirably about 25 mole percent or less of the relatively hydrophobic comonomer may be copolymerized with the ethylene oxide monomer and still yield a hydrophilic crosslinked network when those products are used as polyol intermediates. Thus, the term "polyoxyethylene polyol" is intended to include not only homopolymers of ethylene oxide but also hydrophilic copolymers of ethylene oxide such as those described above wherein all of the polyol derivatives have a hydroxyl functionality of about two or greater and an ethylene oxide content ranging from about 60 mole percent to about 100 mole percent, and preferably greater than about 75 mole percent.

To effect preparation of the crosslinked network polymer, the component including the isocyanate capped polyoxyethylene polyol having a functionality about 2 or greater is simply combined with a particular aqueous component. For simplicity, this isocyanate capped reaction component will be herein referred to as resin reactant.

The aqueous component may appear as water, a water slurry or suspension, a water emulsion, or a water solution having water soluble materials disposed therein. For convenience, the aqueous component is referred to herein as an aqueous reactant.

In contrast to typical polyurethane reactions such as those using catalyst or like promotors where one mole of -NCO is reacted with one half mole water, the present reaction proceeds simply with a large but controlled excess of water.

In typical polyurethane reactions it is known to employ an excess of water in same prepolymer foaming formulations to obtain improved properties. This has been observed at Page 43 in the publication by Saunders and Frisch entitled "polyurethanes", published by Interscience Publishers, where it is further observed that if less than stoichiometric amounts of water are used, the foam is more crosslinked, firmer, has lower elongation and higher density. A large excess of water, they observe, will use up the free isocyanate groups, leaving insufficient isocyanate available for effective crosslinking and resulting in the formation of many free amino end groups. As water content increases, the foam density decreases and above 30–50% excess water results in a marked decrease in physical properties.

The dramatic way in which the addition of water influences practice of the present invention is seen by consideration of the Water Index valve defined as a ratio of equivalents of $H_2O \times 100$ / equivalents of NCO. Here, knowing that in polyurethane foaming reactions one mole of water ultimately consumes two NCO groups. Water Index Valve of 100 indicates that the equivalents of water and equivalents of isocyanate are balanced. An Index of 95 indicates that there is a 5% shortage of water equivalents while an Index of 105 indicates a 5% surplus of water equivalents. A slight shortage of water equivalents (i.e., a slight excess of isocyanate), ususally 3–5%, is common practice in the prior art, particularly with flexible foams.

Using the present resin reactant and water in amounts from about 0.5 mole $H_2O$/mole NCO groups ($H_2O$ Index Value of 100) up to about 2 moles $H_2O$/mole NCO groups ($H_2O$ Index Value of 400) results in poor foaming unless materials such as surfactants and catalysts or the like are included. When using about 6.5 moles $H_2O$ mole/NCO groups (Index Value of 1300) and up to about 390 moles $H_2O$/mole NCO groups. (Index Value 78,000), surprisingly good foams result which improve in characteristics with added amounts of molar water. Thus, the available water content in the aqueous reactant is from about 6.5 to about 390 moles $H_2O$/NCO groups in the resin reactant, i.e., an $H_2O$ Index Value of about 1300 to about 78,000 and desirably from about 4,000 to about 40,000, i.e., about 20 to about 200 moles $H_2O$/NCO groups.

Available water in the aqueous reactant is that water accessible for reaction with the resin reactant, and which is exclusive of water which may layer during reaction, or supplemental water which may be necessary because of further water-absorbtive or water-binding components or additives present in and forming the aqueous reactant.

The reaction may proceed either as a batch reaction or as a continuous reaction. Either the resin reactant may be poured into the aqueous reactant, vice versa, or both may be combined simultaneously such as when using spray or froth application techniques.

The use of large molar excesses of water in the aqueous reactant leads to several important advantages and improvements over the conventional polyurethane foam compositions of the prior art. For example, in conventional polyurethane foam compositions the water concentration must be carefully controlled to near the theoretical amount, usually an amount much less than about an $H_2O$ Index Value of 400 (2.0 moles $H_2O$/NCO groups in the polyurethane reaction components). This low concentration dictates the use of a catalyst to promote the rate of the foaming reaction and requires an intensive mixing step to achieve good mixing of reactants and catalyst such to insure preparation of a uniform product.

In contrast, the present invention requires very large but controlled excess of water, e.g., typically about an $H_2O$ Index Value of about 1,300 to about 78,000. Using this technique, the product quality and uniformity is not highly sensitive to accuracy of metering or accuracy of metering or mixing of the aqueous reactant and the use of a polymerization catalyst or promoter is optional.

Because large amounts of water may be in the aqueous reactant during reaction, i.e., the reaction is not dependent upon a molar NCO-water type reaction, it is possible to combine a great variety of materials in the aqueous reactant which are otherwise not possible with limited water reacting systems.

The aqueous reactant may be used at temperatures from about near 0° C., to about 100° C., as desired. It is possible to effect reaction of the resin reactant using steam as the aqueous component.

Optionally, large amounts of water soluble or water dispersible materials may be added to the aqueous reactant up to 800% by weight of the amount of water in the aqueous reactant, depending of course on the particular material and its weight. Useful additives to the aqueous reactant include flame retardants, antistats, soil repellants, fungicides, insecticides, stabilizers, thickeners, fillers, biostats, color additives, organic solvent, blowing agent, dispersing agent, resin, or the like. By homogeneously distributing these materials in the aqueous reactant, it is possible to effect wide distribution of these materials throughout the finally prepared product. Some or all of the above additives added may also be combined into the resin reactant if desired, thus giving the unique and useful option of having the same or different additives present in either or both components, if desired.

Because the present resins are cross-linked by reaction with large but controlled amounts of water, it is significant that additives may be introduced by means of the aqueous reactant. Thus, the additives may be introduced in a wet condition desirably, and may be effectively dispersed uniformly throughout the cross-linked product.

Useful illustrative examples of materials which may be added include porous structures such as particulate wood fibers; rock wool; glass wool; bagasse; straw; cork; sponge rubber; foamed polystryene; and the like.

Fire or flame retardant additives usefully included alone or in combination in the aqueous reactant are represented by, for example, zinc borate; calcium carbonate; alum; ferrous sulfate; borax; melamine and boric acid; melamine phosphate; ammonium phosphate; stannic oxide; ammonium sulfate; ammonium sulfamate; titanium and antimony oxides in combination with halide materials and in particular the oxychlorides; aluminum hydrate; ceric hydrate; tetrakis (hydroxymethyl) phosphonium chloride; bromoform and triallyl phosphate; phosphoroxytriamide; chlorinated paraffins; tris (2-ethyl hexyl) phosphate; tris (2,3-dibromopropyl) phosphate, triphenyl phosphate, cresyl diphenyl phosphate; and the like.

In forming the present fabric after the resin reactant is formed it is shredded by conventional mechanical techniques to an average particle size of about 0.020 inch mesh to about 0.12 inch mesh The shredded particles, typically about 0.03 inch mesh may be combined desirably with materials such as fibers, and latex in amounts up to about 95% by weight of the particles. The particles, with or without the addition of known binders and auxiliary fibers is next combined with water and the water-particle mixture, is wet layered onto a substrate for drying and production of a sheet of fabric by the present invention. If the substrate, for example is a porous wire screen, the sheet of bound foam particles can be removed as a self supporting foam fabric. If the substrate, however, is a porous web such as paper, cloth or non-woven fibrous web, the result can be an integrally bound foam/substrate composite structure. by suitable layering sequences, such composite can be of the one sided or the two sided, i.e., sandwich type structure. The foam particles may be bound to each other and, if desired, to a substrate by the use of resinous or polymeric binders or by heat fusion techniques.

Thus, upon drying of the sheet, it is possible to prepare tough, flexible to rigid, soft to coarse, light to dense products. Such products using the present hydrophilic materials may be rendered repellant to liquid water yet breathable and thus permable water vapor, while also retaining a great comfort factor.

The present sheets of fabrics retain dimensional stability during wetting and drying cycle and for functional, reinforcing, strenghtening, binding, opacifying or cushioning effects; they are useful for various end products such as drapery backing, upholstery backing, blankets, absorptive padding, wall coverings, acoustical panels, protective and/or fire regardant surfaces, apparel, shoe linings, separation membranes, filters and the like. The feature of water vapor permeability of sponges resulting from the hydrophilic nature of the polyoxyethylene polyol reactant renders them attractive for apparel. These present composites are also useful as leather substitutes.

The following examples will aid in explaining, but should not be deemed as limiting, practice of the present invention. In all cases, unless otherwise noted, all parts and percentages are by weight.

EXAMPLE 1

To a reaction vessel containing 3,092 grams, representing 1 mole, 3 eq. OH, of a triol prepared from potassium hydroxide catalyzed reaction of 92 grams anhydrous glycerol with 3300 grams of ethylene oxide, were added 522 grams, representing 3 moles, 6 eq. NCO of tolylene diisocyanate having about 80/20 mixture of 2,4 isomer/2,6 isomer. The reaction exotherm was kept at 70° C. by external cooling with water, while stirring for 4 hours. The actual isocyanate content, determined by titration with standard n-butylamine solution in toluene, remained at the constant level of 0.79 meq. NCO/gram relative to a theoretical content of 0.83 meq. NCO/gram. The resultant pale yellow syrup was found to solidify at about 30°-35° C., was soluble in toluene, and acetone, readily reacts with water, and had the following average formula:

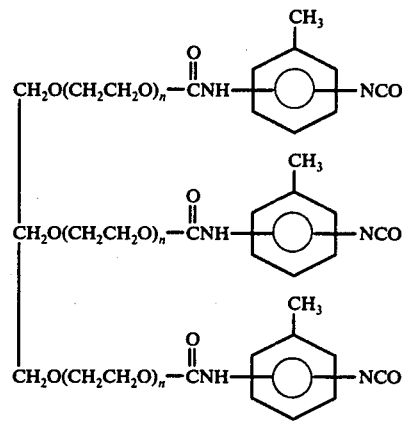

where $n$ has an average value of about 22. The theoretical molecular weight of the resin product is about 3615.

200 grams of the capped resin having an eq. NCO content of 0.016 was stirred briefly and reacted with 200 grams water. The moles $H_2O$/NCO groups was 73.2. The reaction mixture was immediately foamed, shredded mechanically to an average particle size to pass through a wire screen of 0.030 inch mesh and wet layered using the paper pulp technique to prepare a bound foam fabric having a thickness when dry of about 0.125 inches. The hydrophilic product was found to have good breathability and comfort characteristics and excellent moisture equilibrium maintenance.

EXAMPLE 2

To a reaction vessel containing 4,136 grams, representing 1 mole, 4 eq. OH, of a tetrol prepared from sodium methoxide catalyzed reaction of 136 grams pentaerythritol with 4400 grams of ethylene oxide, were added 696 grams of tolylene diisocyanate having about 80/20 mixture of 2,4 isomer/2,6 isomer. The reaction was carried out using the procedure of Example 1. The actual isocyanate content noted was 0.86 meq. NCO/gram relative to a theoretical content of 0.83 meq. NCO/gram. The recovered product was a colorless syrup which solidified at about 35°-40° C., was soluble in toluene and acetone, readily reacts with water, and had the idealized average formula:

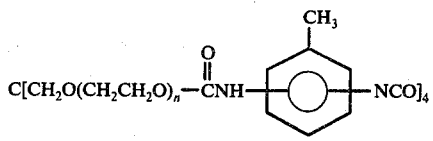

where *n* has an average value of about 22. The theoretical molecular weight of the resin product is about 4832.

50 grams, of the recovered capped resin product from this example, were reacted with 55 grams water. The moles $H_2O$/NCO groups was about 73.2. The foam product was shredded, combined with 7.5 grams cellulosic pulp and 20 grams of acrylic latex. These ingredients were wet layered. Corresponding results to that of Example 1 were realized. It was further noted that the hydrophilic polyurethane interpenetrated the fibers of the fabric and served as a reinforcing binder. The fabric remained soft and pliable.

EXAMPLE 3

A solution of 92 grams glycerol and 1000 grams of polyoxyethylene (1000) glycol was outgassed at 100° C. and 10 Torr for two hours. To the outgassed solution was added 870 grams tolylene diisocyanate having an 80/20 mixture of 2,4 isomer/2,6 isomer. The reaction solution was stirred at 60° C. for 4 hours whereupon the actual isocyanate content reached a constant 2.49 meq. NCO/gram relative to a theoretical content of 2.54. 31.3 parts of the resin product had a theoretical molecular weight of 615.

20 grams of water containing 0.5 grams of antimony trioxide and 5 grams of polyvinyl chloride-latex particles was mixed with 10 grams of the capped resin product having an eq. NCO content of 0.016. The moles $H_2O$/NCO groups was 125. The foam so generated was shredded and layered onto a fabric by the procedure of Example 1. The composite product was found to have excellent comfort, fire retardancy and moisture equilibrium maintenance.

EXAMPLE 4

The procedure of Example 1 was repeated except that 20 grams of the shredded product was combined with 20 grams of water and 1.5% by weight soft wood paper pulp. The product was characterized with a soft open cell structure which was flexible yet fairly tough and was found to have excellent properties.

EXAMPLE 5

In order to demonstrate use of polyoxyethylene polyisocyanate in making products with attractive colors, a 10 gram portion of the polyoxyethylene tetraisocyanate prepared in Example 2 was mixed with 10 grams of water containing 0.5 gram of Hansa yellow color. A composite having a yellow color and the excellent characteristics of the product of Example 2 resulted.

EXAMPLE 6

In order to demonstrate capping of a polyoxyethylene diol with a polyisocyanate having a functionality greater than 2, to give polyisocyanate foams with higher crosslink density and superior physical properties, lower solubility, and greater hydrolytic stability than products from polyoxyethylene diisocyanates, a 1000 gram portion, of polyoxyethylene glycol of 4,000 weight average molecular weight was outgassed at 110° C. and 10 Torr for two hours. Next, to this outgassed liquid was added at 60° C. 200 grams, of polymethylene polyphenylisocyanate commercially available under the name PAPI 901 by Upjohn Co. This latter material has nearly three isocyanate groups per molecule and an isocyanate equivalent weight of 133. A dark reaction solution was noted which was stirred at 60° C. to 70° C. for five hours whereupon the NCO content reached a constant 0.825 meq. NCO/gram relative to a theoretical value of 0.833. The resultant dark product syrup solidified at 45° C. to form a brown, waxy product. Addition of 10 grams of water to 10 grams of the prepared liquid polyisocyanate at 60° C. resulted in a foam and using the procedure of Example 1 gave a resultant tan, soft, flexible, very hydrophilic fabric product.

EXAMPLE 7

In order to illustrate use of copolymers of 75% ethylene oxide and 25% propylene oxide along with methylene dicyclohexyl diisocyanate to form a triisocyanate that readily reacts with water to give a hydrophilic product, a mixture of 13.4 grams, 0.1 mole of trimethylolpropane and 0.6 grams, 0.01 mole of potassium hydroxide was stirred at 100°–180° C. in the presence of 250 grams of ethylene oxide at 20 to 100 psi. After 3 hours the reaction pressure dropped to one atmosphere. To the reaction product syrup was then added 250 grams of propylene oxide with stirring at 100°–180° C., and a pressure of 20 to 75 psi for 4 hours whereupon the reaction pressure at 100° C. dropped to one atmosphere. To this reaction product syrup having a brown color was added 500 grams of ethylene oxide. The reaction was stirred at 100°–180° C. for 12 hours whereupon the reaction pressure dropped to one atmosphere at 100° C. The resultant brown oil was stripped of volatiles at 50° to 100° C. at 10 Torr resulting with 978 grams of brown syrup having a hydroxyl content of 0.32 meq. OH/gram relative to 0.31 meq/gram theory.

To 931 grams, 0.30 eq. OH of the prepared triol was added 88.0 grams, 0.32 moles, of dicyclohexylmethane diisocyanate. The solution stirred at 60° C. for 8 hours whereupon the NCO content of the polymer reached a constant 0.33 meq./gram relative to 0.32 theory. The triisocyanate product was characterized as a light amber syrup having a viscosity of 12,000 cps at 25° C. (Brookfield).

To a 10 gram portion of the above triisocyanate containing 0.1 gram of silicone surfactant L520 by Union Carbide was added with good mixing 12 grams of water. A product having similar properties to those of the product of Example 1 resulted.

EXAMPLE 8

The following substrates were coated on one side by wet layering using the product of Example 3.

| Substrate | Size (Cm.) | Average Thickness Foam Pad (mm) |
|---|---|---|
| Regular kraft paper | 10 × 40 | 4.5 |
| Upholstery fabric, Nylon | 10 × 40 | 4.1 |
| Muslin sheet | 10 × 40 | 5.5 |
| Unbacked, needled carpet, polypropylene fiber, (0.05 g/cm² density) | 20 × 40 | 4.5 |
| Rayon nonwoven web | 10 × 40 | 3.8 |
| Polyethylene nonwoven | 10 × 40 | 3.5 |

-continued

| Substrate | Size (Cm.) | Average Thickness Foam Pad (mm) |
| --- | --- | --- |
| wet | | |

EXAMPLE 9

Sheets were prepared by mixing the shredded foam of Example 1 and additional ingredients as stated in the table below into about 4 liters of water with processing through a "Williams Standard Pulp Testing Apparatus".

| Cong. Shredded HYPOL (g) | Pulp Conc. (g) | CSF[1] | Asbestos Conc. (g) | Latex (Solids) Conc. (g) | Alum Conc. (g) | Substrate[2] |
| --- | --- | --- | --- | --- | --- | --- |
| 25 | 25 | 600 | — | — | — | Cheese Cloth |
| 25 | 5 | 600 | — | 8 | — | Nonwoven Polyester Web |
| 60 | 5 | 600 | — | — | — | — |
| 60 | 10 | 520 | — | — | — | Upholstry Fabric |
| 25 | — | — | 25 | 7 | 0.6 | — |
| 50 | 10 | 420 | — | — | — | — |

[1] Canadian Standard Freeness
[2] The wire screen of the Pulp Testing Apparatus was covered by the substrate and the foam sheet formed on the substrate during processing.

Corresponding results may be realized.

EXAMPLE 10

The procedure of Example 8 was repeated using a 20 × 24 cm. polyamide unbacked carpet except that 30 grams of shredded foam was wet layered.

EXAMPLE 11

The procedure of Example 9 was repeated except that a 10 × 40 inch section of muslin sheet was laminated by wet layering with 15 grams of shredded foam.

A 6 mm thick pad of flexible foam laminate resulted; the muslin fabric being integrally bonded. This product was very absorbent of water and was useful as a wiping cloth; similar in effectiveness to chamois. It is also useful as a fabric interliner for wearing apparel, shoe and boot linings and insoles, various types of gas and liquid filters, light weight blankets, mattress covers, coasters, tablecloths, diapers, incontinent pads, upholstery fabrics, mattress ticking, drapery fabrics, sound absorbing wall coverings, vehicle headlining materials, carpet and rug under padding, bathroom and bedroom slippers and the like.

It is understood that the foregoing detailed description is given merely by way of illustration and that many variations may be made therein without departing from the spirit of this invention.

What is claimed is:

1. A composite which comprises in combination, a fabric consisting essentially of a porous woven or non-woven fibrous web and a hydrophilic crosslinked polyurethane layered thereon having a three-dimensional network, said polyurethane comprising shredded foam particles, said foam being the reaction product of a resin component and an aqueous reactant, said resin component comprising isocyanate-capped polyoxyethylene polyol having a reaction functionality greater than two, and a second component comprising aqueous reactant, the water index value being about 1,300 to about 78,000 $H_2O$ and wherein the capped polyoxyethylene polyol is present in the first component in an amount from about 3% by weight up to 100% by weight, wherein the capped polyoxyethylene polyol having a terminal member with an isocyanate functionality of two is present in an amount from 0% up to about 97% by weight, wherein the polyoxyethylene polyol moiety of the isocyanate capped member has a weight average molecular weight of about 200 to about 20,000 and a hydroxyl functionality of about 2 to about 8, and wherein the average particle size of the foam particles is about 0.02 inch mesh to about 0.12 inch mesh.

2. The composite of claim 1 wherein the weight average molecular weight is about 600 to about 6,000.

3. The composite of claim 1 wherein the aqueous reactant is a member of the group consisting of water, water slurry, water suspension, water emulsion and water solution.

4. The composite of claim 1 wherein the water index value is about 4,000 to about 40,000.

5. The composite of claim 1 wherein the aqueous reactant additionally comprises a member selected from the group consisting of a sound deadening agent, flame retardant, organic solvent, blowing agent, antistat, soil repellant, fungicide, insecticide, thickening agent, dispersing agent, resin, polymer filler, biostats, color additive and the like.

6. The composite of claim 1 wherein the fabric is woven or non-woven, synthetic or natural fibers.

7. A composite which comprises in combination a fabric consisting essentially of a porous woven or non-woven fibrous web and a hydrophilic crosslinked polyurethane layered thereon having a three-dimensional network, said polyurethane being comprised of shredded particles and the reaction product of a resin component and an aqueous reactant, said resin component comprising isocyanate capped polyoxyethylene polyol having a reaction functionality equal to about two, a second component comprising aqueous reactant, and a third component comprising a crosslinking agent having a reaction functionality greater than two, wherein the polyoxyethylene polyol moiety of the isocyanate capped member has a weight average molecular weight of about 200 to about 20,000, and a hydroxyl functionality of about 2 to about 8, and wherein the average particle size is about 0.02 inch mesh to about 0.12 inch mesh.

8. The composite of claim 7 wherein the weight average molecular weight is about 600 to about 6,000.

9. The composite of claim 7 wherein the aqueous reactant is a member of the group consisting of water, water slurry, water suspension, water emulsion and water solution.

10. The composite of claim 7 wherein the water index value is from about 4,000 to about 40,000.

11. The composite of claim 7 wherein the aqueous reactant additionally comprises a member selected from the group consisting of a sound deadening agent, flame retardant, organic solvent, blowing agent, antistat, soil repellant, fungicide, insecticide, thickening agent, dispersing agent, resin, polymer, filler biostats, color additive and the like.

12. The composite of claim 7 wherein the crosslinking agent of the third component is a polyol.

13. The composite of claim 7 wherein the crosslinking agent of the third component is a polyamine.

14. The composite of claim 7 wherein the crosslinking agent of the third coponent is a polythiol.

15. The composite of claim 7 wherein the crosslinking agent of the third component is a polyisocyanate.

16. A method for preparing a composite which comprises reacting a first component comprising isocyanate capped polyoxyethylene polyol having a reaction functionality greater than two, with a second component comprising aqueous reactant, the water index value being about 1,300 to about 78,000 $H_2O$ and wherein the capped polyoxyethylene polyol is present in the first component in an amount from about 3% by weight up to 100% by weight, wherein a capped polyoxyethylene polyol having a terminal member with an isocyanate functionality of two is present in an amount from 0% up to about 97% by weight, wherein the polyoxyethylene polyol moiety of the isocyanate capped member has a weight average molecular weight of about 200 to about 20,000, and a hydroxyl functionality of about 2 to about 8, shredding the generated foam product of the reaction to an average particle size of about 0.02 inch mesh to about 0.12 inch mesh and layering the shredded particles onto a fabric substrate consisting essentially of a porous woven or non-woven fibrous web.

17. The method of claim 16 wherein the weight average molecular weight is about 600 to about 6,000.

18. A method for preparing a composite which comprises reacting a first component comprising isocyanate capped polyoxyethylene polyol having a reaction functionality equal to about two, a second component comprising aqueous reactant, and a third component comprising a crosslinking agent having a reaction functionality greater than two, wherein the polyoxyethylene polyol moiety of the isocyanate capped member has a weight average molecular weight of about 200 to about 20,000 and a hydroxyl functionality of about 2 to about 8, shredding the generated foam product of the reaction to an average particle size of about 0.02 inch mesh to about 0.12 inch mesh and layering the shredded particles onto a fabric substrate consisting essentially of a porous woven or non-woven fibrous web.

19. The method of claim 18 wherein the crosslinking agent of the third component is a polyamine.

20. The method of claim 18 wherein the crosslinking agent of the third component is a polythiol.

21. The method of claim 18 wherein the crosslinking agent of the third component is a polyisocyanate.

* * * * *